(12) United States Patent
Nanson et al.

(10) Patent No.: US 8,723,863 B2
(45) Date of Patent: May 13, 2014

(54) DATA PROCESSING SYSTEM WITH CONSTRUCTION GEOMETRY

(75) Inventors: Peter Philip Lonsdale Nanson, Cambridge (GB); Howard Charles Duncan Mattson, Cambridge (GB); Richard Charles Collins, Cambridge (GB); Douglas Joseph King, Peterborough (GB)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 624 days.

(21) Appl. No.: 12/831,584

(22) Filed: Jul. 7, 2010

(65) Prior Publication Data

US 2012/0007864 A1    Jan. 12, 2012

(51) Int. Cl.
*G06T 17/00* (2006.01)
*G06F 17/50* (2006.01)
*G06F 7/60* (2006.01)
*G06F 17/10* (2006.01)

(52) U.S. Cl.
USPC .............. 345/420; 703/1; 703/2; 715/964

(58) Field of Classification Search
None
See application file for complete search history.

(56) References Cited

U.S. PATENT DOCUMENTS

| | | | |
|---|---|---|---|
| 6,720,963 B2 * | 4/2004 | Yoshida et al. | 345/420 |
| 6,898,560 B1 * | 5/2005 | Das | 703/7 |
| 7,236,167 B2 * | 6/2007 | Lee et al. | 345/420 |
| 7,408,560 B2 * | 8/2008 | Staples et al. | 345/619 |
| 7,768,526 B2 * | 8/2010 | Jungreis et al. | 345/619 |
| 2008/0036761 A1 * | 2/2008 | Mazzanti | 345/420 |

OTHER PUBLICATIONS

Alfredo Perez and David Serrano, Constraint Based Analysis Tools for Design, 2nd ACM Solid Modeling '93, ACM, pp. 281-290.*
PCT International Search Report mailed Jan. 17, 2012 corresponding to PCT International Application No. PCT/US2011/043050 filed Jul. 6, 2011 (21 pages).
Wolfgang Sohrt & Beat D. Bruderlin, Interaction with Constraints in 3D Modeling, Jun. 5, 1991, Dept of Computer Science, University of Utah, (pp. 387-396); Magazine; (10 pages).
Ivan E. Sutherland, Sketchpad: A Man-Machine Graphical Communication System, Baltimore, Spartan Books, US, vol. 1963, vol. 23, May 1, 1963 (pp. 329-346); Magazine; (18 pages).
Non-Final Office Action issued Nov. 19, 2013 in U.S. Appl. No. 13/091,203, 21 pages.
Cu, Xiufen, et al., "An efficient algorithm for recognizing and suppressing blend features." Computer Integrated Manufacturing Systems—Beijing 10.1 (2004): 77-82.

* cited by examiner

*Primary Examiner* — Kee M Tung
*Assistant Examiner* — Haixia Du (57) ABSTRACT

A CAD system, method, and computer readable medium. A method for modeling a topological structure includes receiving a definition of a topological structure. The method also includes receiving a definition of a construction element and receiving a geometrical relationship between the construction element and an element of the topological structure. The method further includes receiving a change to the topological structure and, in response to the change, changing the first construction element according to the geometrical relationship.

21 Claims, 5 Drawing Sheets

DATA PROCESSING SYSTEM WITH CONSTRUCTION GEOMETRY

TECHNICAL FIELD

The present disclosure is directed, in general, to systems and methods for use in computer-aided design, manufacturing, using, modeling, and visualization (individually and collectively, "CAD" and "CAD systems") and in product lifecycle management ("PLM") and other systems.

BACKGROUND OF THE DISCLOSURE

Many manufactured products are first designed and modeled in CAD systems, and PLM systems are used by manufacturers, retailers, customers, and other users to manage the design, use, maintenance, and disposal of various products. Improved systems are desirable.

SUMMARY OF THE DISCLOSURE

Various embodiments include a data processing system, method, and computer readable medium. A method for modeling a topological structure includes receiving a definition of a topological structure. The method also includes receiving a definition of a construction element and receiving a geometrical relationship between the construction element and an element of the topological structure. The method further includes receiving a change to the topological structure and, in response to the change, changing the first construction element according to the geometrical relationship.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 5D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Figure 1:
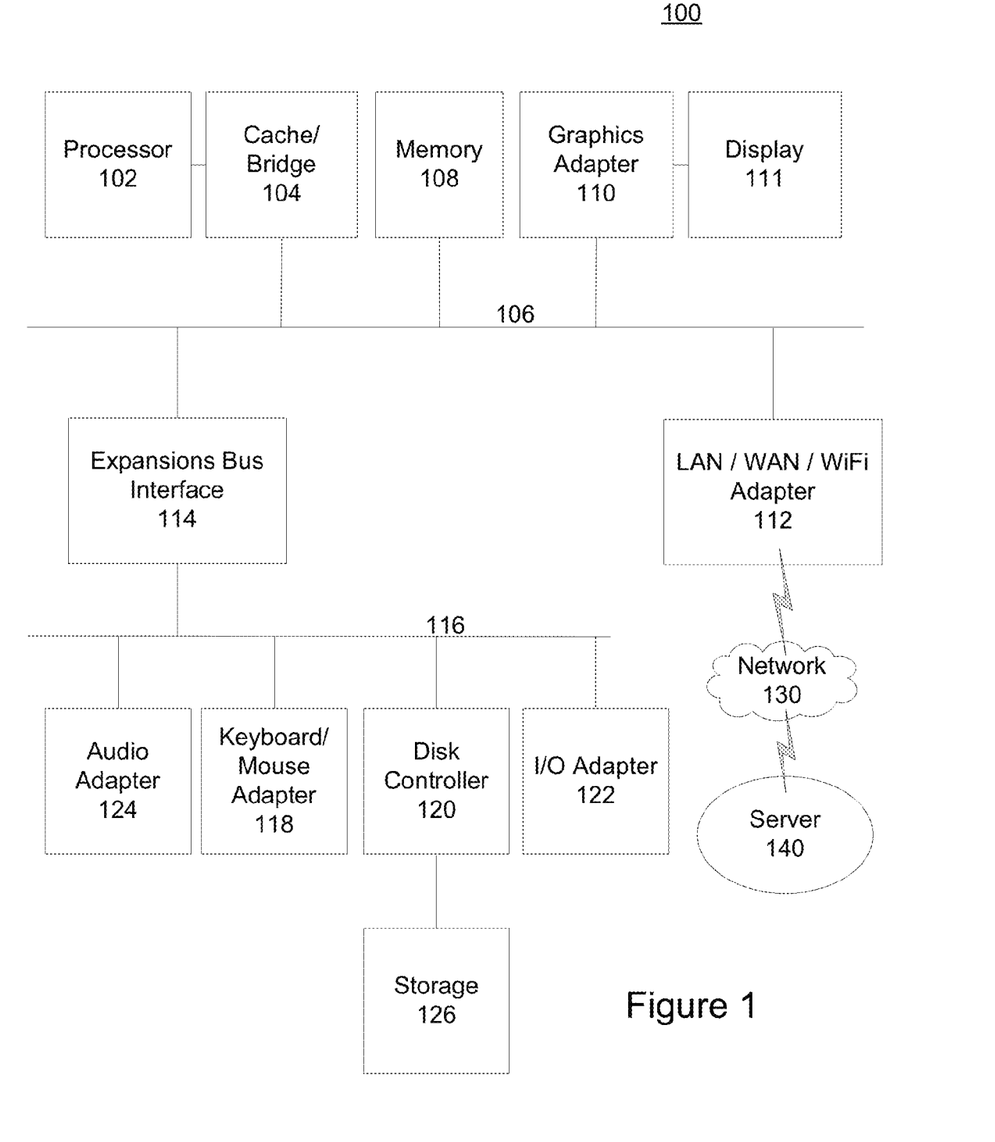
FIG. 1 depicts a block diagram of a data processing system in which an embodiment can be implemented.
Figure 2:
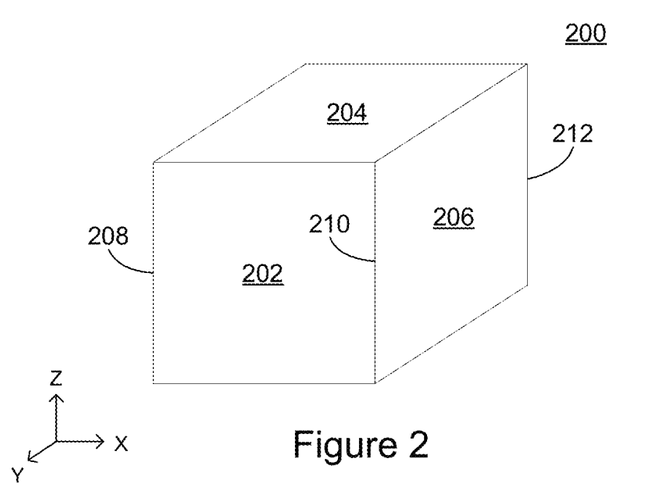
FIG. 2 depicts a topological structure.

FIG. 1 depicts a block diagram of a data processing system 100 in which an embodiment can be implemented, for example as a CAD or PLM system configured to perform processes as described herein. The data processing system 100 includes a processor 102 connected to a level two cache/bridge 104, which is connected in turn to a local system bus 106. The local system bus 106 may be, for example, a peripheral component interconnect (PCI) architecture bus. Also connected to the local system bus 106 in the depicted example are a main memory 108 and a graphics adapter 110. The graphics adapter 110 may be connected to a display 111.

Other peripherals, such as a local area network (LAN)/Wide Area Network/Wireless (e.g. WiFi) adapter 112, may also be connected to the local system bus 106. An expansion bus interface 114 connects the local system bus 106 to an input/output (I/O) bus 116. The I/O bus 116 is connected to a keyboard/mouse adapter 118, a disk controller 120, and an I/O adapter 122. The disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to the I/O bus 116 in the example shown is an audio adapter 124, to which speakers (not shown) may be connected for playing sounds. The keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

The LAN/WAN/Wireless adapter 112 can be connected to a network 130 (not a part of data processing system 100), which can be any public or private data processing system network or combination of networks, as known to those of skill in the art, including the Internet. The data processing system 100 can communicate over the network 130 with a server system 140, which is also not part of the data processing system 100, but can be implemented, for example, as a separate data processing system 100.

The data processing system 100 may be modified to operate as a CAD or PLM system and configured to perform processes as described herein. Such CAD and PLM systems provide modeling of topological structures such as the rectangular body 200 depicted in FIG. 2. The rectangular body 200 may be modeled as a solid or as a body made of sheet faces.

The body 200 is referred to as a topological structure because, as faces of the body 200 are moved, bent or stretched, the connectivity of the faces and edges of the body 200 remain invariant. For example, a top face 204 is connected by edges at its boundary to a front face 202, a right side face 206, and a back face and a left side face (neither visible in FIG. 2). If the face 204 is moved in the Z direction, edges 208, 210 and 212 (as well as an unseen edge between the back and left side faces) will be lengthened or shortened to maintain invariant the topology of the body 200. Similarly, if the face 204 is moved in the X and/or Y direction, angles that the edges 208, 210 and 212 make with the bottom edges of the faces 202 and 206 may change, and the faces 202 and 206 may change into parallelograms, again to maintain invariant the topology of the body 200.

CAD elements include faces, edges and lines. In a topological structure, the topological invariants are automatically provided and maintained as invariant by the data processing system 100. Such topological invariants cannot be overridden to produce a topologically invalid body. Instead, changes to a topological body that would produce a topologically invalid body cause the data processing system 100 to generate a new topological body with a new set of topological invariants.

Figure 3:
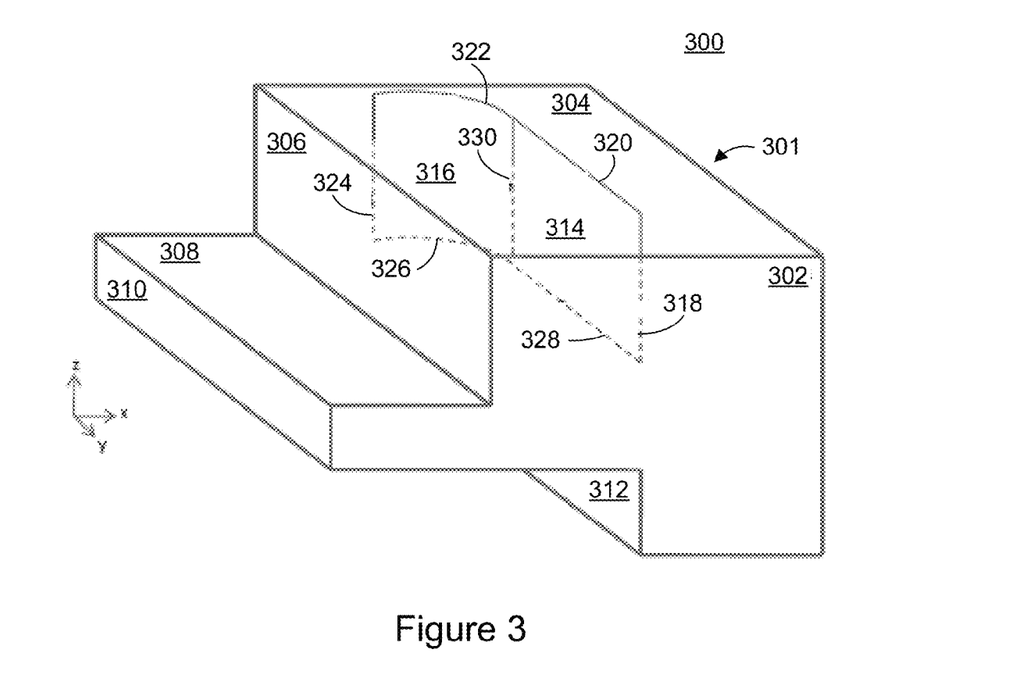
FIG. 3 depicts a topological structure and construction elements according to the disclosure.

FIG. 3 depicts a topological structure 300 having a more complex shape. The body 300 includes faces 302, 304, 306, 308, 310 and 312, as well as two unseen back sides and two unseen bottom sides, which collectively may be referred to as the main body 301 of the structure 300. When variational edits (such as moving, bending and/or stretching) are performed on the main body 301, the data processing system 100 will maintain the topological validity of the main body 301.

However, the structure 300 includes additional construction elements according to the disclosure. Construction faces 314 and 316 are added to the structure 300, with geometrical, rather than topological, relationships to elements of the main body 301. The construction face 314 includes, at its boundary, construction edges 328, 318, 320 and 330. The construction face 316 includes, at its boundary, construction edges 322, 324, 326 and 330. Construction faces 314 and 316 have a topological relationship to each other, which is embodied in the construction edge 330.

The following geometrical relationships are defined for the construction faces 314 and 316:

The surfaces of the construction face 314 and the main body face 312 have a coincidence relationship; the two surfaces are coincident.

A laminar construction edge 318 is defined by an intersection of the construction face 314 with the surface of the main body face 302.

Laminar construction edges 320 and 322 are defined by intersections of construction faces 314 and 316, respectively, with a +10 unit offset of the surface of the main body face 304.

A laminar construction edge 324 is defined by the intersection of construction face 316 with a −10 unit offset of the main body face 306.

Laminar construction edges 326 and 328 are defined by the intersection of construction faces 316 and 314 with the surface of main body face 308.

These geometrical relationships are maintained under variational edits to the main body 301.

If the main body face 302 is moved in a +Y direction, the construction face 314 extends its boundary and the edge 318 remains "on" the main body face 302.

If the main body face 312 is offset in a −X direction, the construction face 314 is offset to remain coincident with the main body face 312, and the topological relationship between the construction faces 314 and 316 causes the construction edge 330 to remain incident to the construction faces 314 and 316.

If the radius of the blend face 316 is increased: the construction edge 324 is retrimmed with the construction face 316 and the specified offset of the main body face 306, the construction edge 330 maintains incidence with the construction faces 316 and 314, the construction edges 322 and 326 are retrimmed to meet the construction edges 324 and 330, and the construction face 314 may move to maintain a tangential relationship with the construction face 316

If the construction face 314 is rotated, the rotation is performed in a way that maintains the coincidence relation between construction face 314 and the surface of the main body face 312, the construction face 316 rotates to maintain the tangent relation between the construction faces 316 and 314, the construction edge 330 is trimmed along with the construction faces 316 and 314, and the construction edges 318-328 are retrimmed with their associated construction faces' surfaces.

If the main body face 308 is moved, the construction edges 326 and 328 are retrimmed accordingly.

Figure 4:
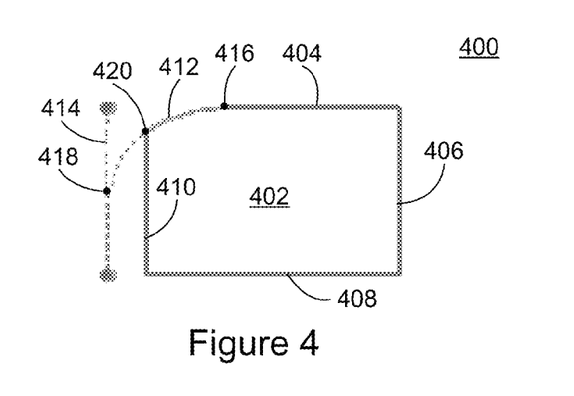
FIG. 4 depicts another topological structure and construction element according to the disclosure.

FIG. 4 illustrates an example of a use of construction elements according to the disclosure. FIG. 4 presents a side view of a topological main body 402 is defined, which includes faces 404, 406, 408, 410 and 412, which appear as lines in FIG. 4. If, for example, the face 408 is moved downward, and the faces 410 and 406 are extended to maintain the topological validity of the main body 402. A construction face 414

(vertical to the page and appearing as a line in FIG. 4) is defined as parallel to and at a specified −Y offset from the face 410.

The face 412 is defined as a blend face having a specified radius and extending from a boundary edge 416 of the face 404 to a line 418 on the construction face 414. The boundary edge 420 of the face 410 is defined as the intersection of the faces 410 and 412. If the construction face 414 is moved relative to the face 410, the line 418 moves with it and the boundary edge 420 and the face 410 are retrimmed accordingly. If changes are made to the width of the face 404, the position of the line 418 on the construction face 414, or the radius of the face 412, the face 412 and the boundary edge 416 are retrimmed to maintain the topological validity of the main body 402.

Relationships between construction elements and main body elements are referred to as geometrical because they represent spatial relations between points, lines, and surfaces. Such geometrical relationships may also be referred to as pseudo-topological, because the relationships are kept synchronized as variational changes are made to elements of the main body. Specified topological relationships may be created by a user between the construction faces, but such relationships are not created automatically by the data processing system 100. Furthermore, construction elements are not fused into or become a formal part of the main body topology.

As part of the management of construction topology, the data processing system 100 is modified to avoid a build-up of unused construction elements that are not connected to main body elements. To this end, a system of references to the construction elements is maintained and a construction element is removed when no such reference to it exists. Such absence of reference may occur, for example, when a main body is modified in a way that removes all main body elements with which a construction element has geometrical relationships.

Adding a persistent coincidence relationship between corresponding construction and main body elements allows the data processing system 100 to keep them geometrically identical and correctly update anything that depends on either element, allowing the data processing system 100 to maintain synchronisation. Adding control for a laminar edge that exist in either the construction or main body faces by providing association to another intersection surface allows the laminar edge to be controlled in a flexible way and help maintain reasonable form through subsequent operations. The intersection surface, itself, may be defined in any procedural or variational way and so need not be a direct surface in the model. For example, it may be an offset of a surface in a model face.

The data processing system 100 may display construction elements to the end user in a way that graphically differentiates them, for information or for selection and manipulation. Operations on main body elements may cause associated construction elements to update accordingly and operations on construction elements may cause associated main body elements and other construction elements to update accordingly. Such updates are performed according to the geometrical relationships established by the user between the construction and main body elements and the geometrical and topological relationships established by the user between construction elements. Operations that result in updates to other elements include, but are not limited to: selection, move, rotate, transform, replace, deform, taper, offset, dimension edit, pattern edit, and shell edit.

FIGS. 5A-5D depict a method according to the disclosure. In step 505, the data processing system 100 receives a definition of a topological structure. The definition of the topological structure may include definitions of one or more structure elements of the topological structure. In step 510, the data processing system 100 receives a definition of a first construction element. In step 515, the data processing system 100 receives a first geometrical relationship between the first construction element and one of the one or more structure elements of the topological structure.

Figure 5A:
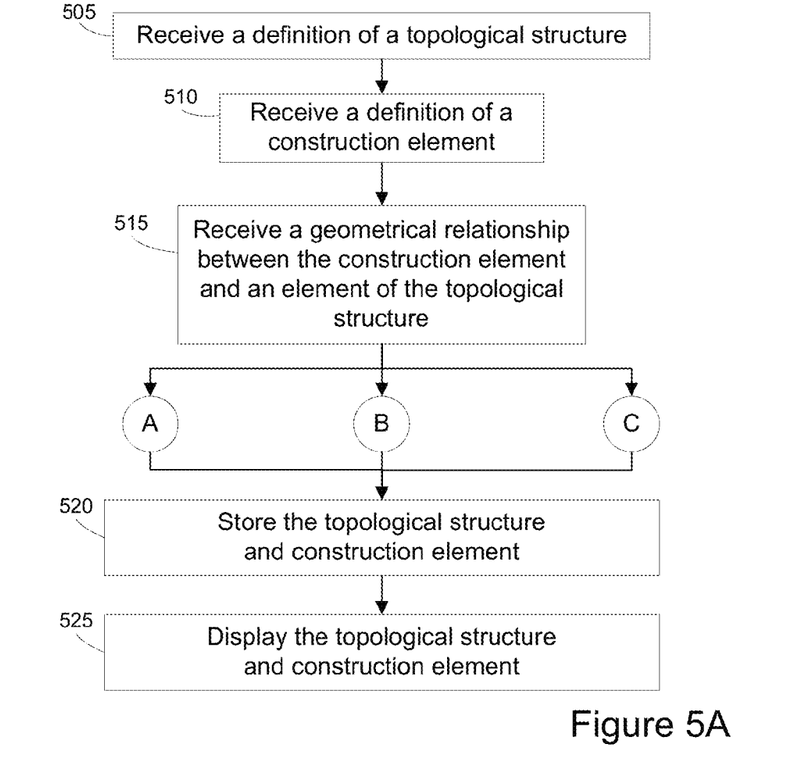
FIGS. 5A-5D depict a method according to the disclosure.
Figure 5B:
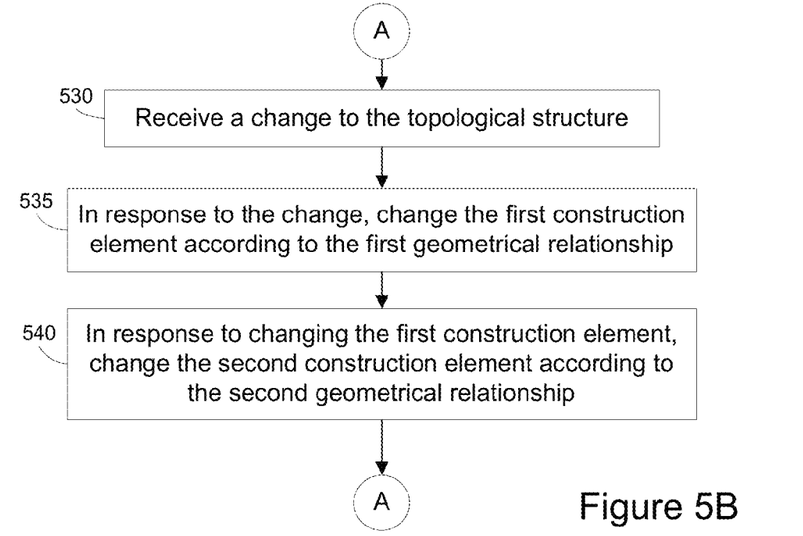

After step 515, the data processing system 100 may return to step 505 to redefine a first of the plurality of structure elements, where the redefinition refers to a second of the plurality of structure elements and the first construction element. In other cases, after step 515, the data processing system 100 may return to step 510 to receive a definition of a second construction element, followed by, in step 515, receiving a geometrical relationship between the second construction element and the first construction element (or an element of the topological structure). In still other cases, after step 515, the data processing system 100 may return to step 510 to redefine the first construction element, or to step 515, to redefine the geometrical relationship between the first construction element and the one of the structure elements of the topological structure. (or to define a geometrical relationship between the first construction element and another construction element).

Where the first or second construction element is a construction face, the associated geometrical relationship may include a coincidence relationship between the construction face and a face of the topological structure. Other geometrical relationships that may be established between construction faces and topological structure faces include offset, symmetry, concentric, tangent and other appropriate relationships.

Where the first or second construction element is a construction edge, the definition of the first construction element may include an intersection between a construction face and a face of the topological structure. Other geometrical relationships that may be established between construction edges and topological structure faces include offset and other appropriate relationships.

Figure 5C:
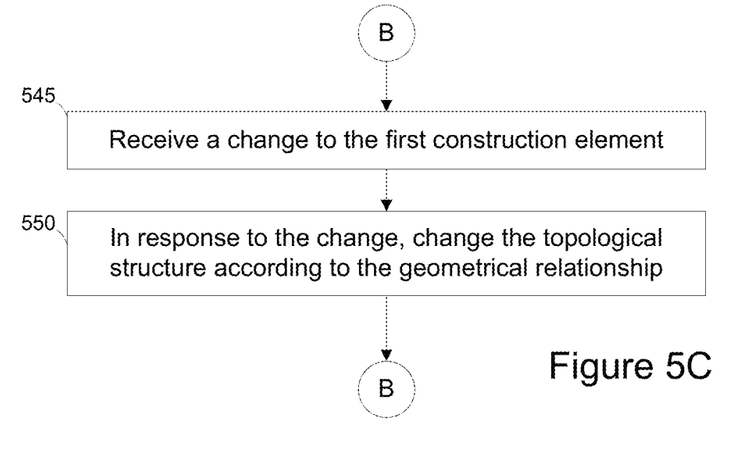
Figure 5D:
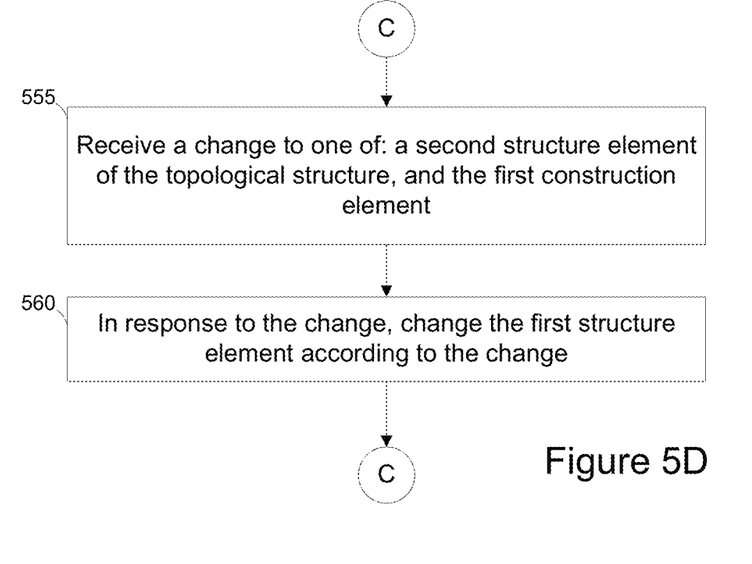

After step 515, the data processing system 100 may proceed to step 530 (FIG. 5B), step 545 (FIG. 5C), or step 555 (FIG. 5D). Upon completion of those processes, the process returns to step 520, where the data processing system 100 stores the topological structure and construction element(s). In step 525, the data processing system 100 displays the topological structure and construction element(s).

In step 530 (FIG. 5B), the data processing system 100 receives a change to the topological structure. In step 535, if the first geometrical relationship so provides, in response to the change, the data processor system 100 changes the first construction element according to the first geometrical relationship. In step 540, if a second construction element exists having a geometrical relationship with the first construction element and if the second geometrical relationship so provides, the data processor system 100 changes the second construction element according to the second geometrical relationship, in response to the change to the first construction element in step 535.

After step 540, the data processor system 100 proceeds to node C. From node C, the data processor system 100 may proceed to step 505 to receive a definition of an additional topological structure or a modification to the definition of the topological structure previously received in step 505. Alternatively, from node C the data processor system 100 may proceed to step 510 or step 520, to receive a modification to the definition or geometrical relationship of a previously received construction element, or to receive a definition of yet another construction element and associated geometrical relationship. As yet another alternative, from node C the data processing system may proceed to step 530 (FIG. 5A), step 545 (FIG. 5B), or step 555 (FIG. 5C).

In step 545 (FIG. 5B), the data processing system 100 receives a change to the first (or other) construction element. In step 550, if the associated geometrical relationship so provides, in response to the change, the data processing system 100 changes the topological structure according to the geometrical relationship. After step 550, the data processing system 100 returns to node C.

In step 505 the definition of the topological structure may have been modified to redefine a first of the plurality of structure elements, referring to a second of the plurality of structure elements and the first (or other) construction element. In such circumstances, in step 555 (FIG. 5C), the data processing system 100 may receive a change to the second structure element or the first (or other) construction element. In response to the change, the data processing system 100 may change the first structure element according to the received change.

According to various embodiments, one or more of the processes or steps described in relation to FIG. 5 may be performed alternately, concurrently, repeatedly, or in a different order, unless otherwise specifically described or claimed. "Receiving," as used herein, can include loading from storage, receiving from another data processing system such as over a network, receiving via an interaction with a user, a combination of these, or otherwise, as recognized by those of skill in the art.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for modeling a topological structure, comprising:
   receiving in a data processing system a definition of a topological structure having a main body topology;
   receiving in the data processing system a definition of a first construction element, wherein the first construction element is not fused into or a part of the main body topology;
   receiving in the data processing system a geometrical relationship between the first construction element and an element of the topological structure, the geometrical relationship comprising a laminar edge defined by an intersection between a face of the construction element and an offset of a face of the topological structure;
   receiving in the data processing system a first change to the topological structure;
   in response to the first change, changing the first construction element in the data processing system according to the geometrical relationship; and
   in response to determining that the geometrical relationship between the first construction element and the element of the topological structure no longer exists and that no other geometrical relationships exist between the first construction element and the topological structure, removing the first construction element from the data processing system.

2. The method of claim 1, further comprising:
   receiving in the data processing system a definition of a second construction element, wherein the second construction element is not fused into or a part of the main body topology;
   receiving in the data processing system a second geometrical relationship between the second construction element and the first construction element; and
   in response to changing the first construction element, in the data processing system changing the second construction element according to the second geometrical relationship.

3. The method of claim 1, further comprising:
   receiving in the data processing system a second change to the first construction element; and
   in response to the second change, in the data processing system changing the topological structure according to the geometrical relationship.

4. The method of claim 1, wherein the first construction element is a construction face and the geometrical relationship is a coincidence relationship between the construction face and a face of the topological structure.

5. The method of claim 1, wherein the first construction element is a construction edge and the definition of the first construction element is an intersection between a construction face and a face of the topological structure.

6. The method of claim 1, wherein the definition of the topological structure comprises a definition of a first structure element of the topological structure that refers to a second structure element of the topological structure and the first construction element.

7. The method of claim 6, further comprising:
   receiving in the data processing system a second change to one of: the second structure element and the first construction element; and in response to the second change, in the data processing system changing the first structure element according to the second change.

8. A data processing system comprising a processor and accessible memory, the data processing system particularly configured to perform the steps of:
receiving a definition of a topological structure having a main body topology;
receiving a definition of a first construction element, wherein the first construction element is not fused into or a part of the main body topology;
receiving a geometrical relationship between the first construction element and an element of the topological structure, the geometrical relationship comprising a laminar edge defined by an intersection between a face of the construction element and an offset of a face of the topological structure;
receiving a change to the topological structure;
in response to the change to the topological structure, changing the first construction element according to the geometrical relationship; and
in response to determining that the geometrical relationship between the first construction element and the element of the topological structure no longer exists and that no other geometrical relationships exist between the first construction element and the topological structure, removing the first construction element from the data processing system.

9. The data processing system of claim 8, the data processing system further configured to perform the steps of:
receiving a definition of a second construction element, wherein the second construction element is not fused into or a part of the main body topology;
receiving a second geometrical relationship between the second construction element and the first construction element; and
in response to changing the first construction element, changing the second construction element according to the second geometrical relationship.

10. The data processing system of claim 8, the data processing system further configured to perform the steps of:
receiving a change to the first construction element; and
in response to the change to the first construction element, changing the topological structure according to the geometrical relationship.

11. The data processing system of claim 8, wherein the first construction element is a construction face and the geometrical relationship is a coincidence relationship between the construction face and a face of the topological structure.

12. The data processing system of claim 8, wherein the first construction element is a construction edge and the definition of the first construction element is an intersection between a construction face and a face of the topological structure.

13. The data processing system of claim 8, wherein the definition of the topological structure comprises a definition of a first structure element of the topological structure that refers to a second structure element of the topological structure and the first construction element.

14. The data processing system of claim 13, the data processing system further configured to perform the steps of:
receiving a second change to one of the second structure element and the first construction element; and
in response to the second change, changing the first structure element according to the second change.

15. A non-transitory computer-readable storage medium encoded with computer-executable instructions that, when executed, cause a data processing system to perform the steps of:
receiving a definition of a topological structure having a main body topology;
receiving a definition of a first construction element, wherein the first construction element is not fused into or a part of the main body topology;
receiving a geometrical relationship between the first construction element and an element of the topological structure, the geometrical relationship comprising a laminar edge defined by an intersection between a face of the construction element and an offset of a face of the topological structure;
receiving a change to the topological structure;
in response to the change to the topological structure, changing the first construction element according to the geometrical relationship; and
in response to determining that the geometrical relationship between the first construction element and the element of the topological structure no longer exists and that no other geometrical relationships exist between the first construction element and the topological structure, removing the first construction element from the data processing system.

16. The computer-readable storage medium of claim 15, further encoded with computer-executable instructions that, when executed, cause a data processing system to perform the steps of:
receiving a definition of a second construction, wherein the second construction element is not fused into or a part of the main body topology;
receiving a second geometrical relationship between the second construction element and the first construction element; and
in response to changing the first construction element, changing the second construction element according to the second geometrical relationship.

17. The computer-readable storage medium of claim 15, further encoded with computer-executable instructions that, when executed, cause a data processing system to perform the steps of:
receiving a change to the first construction element; and
in response to the change to the first construction element, changing the topological structure according to the geometrical relationship.

18. The computer-readable storage medium of claim 15, wherein the first construction element is a construction face and the geometrical relationship is a coincidence relationship between the construction face and a face of the topological structure.

19. The computer-readable storage medium of claim 15, wherein the first construction element is a construction edge and the definition of the first construction element is an intersection between a construction face and a face of the topological structure.

20. The computer-readable storage medium of claim 15, wherein the definition of the topological structure comprises a definition of a first structure element of the topological structure that refers to a second structure element of the topological structure and the first construction element.

21. The computer-readable storage medium of claim 20, further encoded with computer-executable instructions that, when executed, cause a data processing system to perform the steps of:

receiving a second change to one of: the second structure element and the first construction element; and in response to the second change, changing the first structure element according to the second change.

\* \* \* \* \*